United States Patent
Wolff et al.

(10) Patent No.: US 7,501,366 B2
(45) Date of Patent: Mar. 10, 2009

(54) LEAD-FREE OPTICAL GLASSES WITH A HARD FLINT POSITION

(75) Inventors: Silke Wolff, Hueckeswagen (DE); Stefanie Hansen, Gensingen (DE); Ute Woelfel, Mainz-Laubenheim (DE)

(73) Assignee: Schott Ag, Mainz (DE)

( * ) Notice: Subject to any disclaimer, the term of this patent is extended or adjusted under 35 U.S.C. 154(b) by 0 days.

(21) Appl. No.: 11/687,059

(22) Filed: Mar. 16, 2007

(65) Prior Publication Data

US 2007/0225146 A1    Sep. 27, 2007

(30) Foreign Application Priority Data

Mar. 22, 2006   (DE) ................ 10 2006 013 599

(51) Int. Cl.
   *C03C 3/16*   (2006.01)
   *C03C 3/21*   (2006.01)
   *C03C 3/12*   (2006.01)
   *C03C 3/062*  (2006.01)

(52) U.S. Cl. .................... 501/45; 501/41; 501/46; 501/901

(58) Field of Classification Search ............. 501/46, 501/41, 45, 73
   See application file for complete search history.

(56) References Cited

U.S. PATENT DOCUMENTS

| | | | |
|---|---|---|---|
| 4,261,751 A | 4/1981 | Nakamura et al. | |
| 6,333,282 B1* | 12/2001 | Nakahata et al. | 501/45 |
| 2002/0042337 A1* | 4/2002 | Zou et al. | 501/45 |
| 2002/0073735 A1* | 6/2002 | Hayashi et al. | 65/32.1 |
| 2004/0266602 A1* | 12/2004 | Fujiwara et al. | 501/46 |

FOREIGN PATENT DOCUMENTS

| | | |
|---|---|---|
| DE | 29 05 875 | 9/1979 |
| EP | 1 382 582 | 1/2004 |
| EP | 1 468 974 | 10/2004 |
| EP | 1 493 720 | 1/2005 |
| JP | 09188540 | 7/1997 |

* cited by examiner

*Primary Examiner*—Jerry Lorengo
*Assistant Examiner*—Matthew E Hoban
(74) *Attorney, Agent, or Firm*—Michael J. Striker

(57) ABSTRACT

Optical glasses are described, which are useful for imaging, sensors, microscopy, medical technology, digital protection, photolithography, laser technology, wafer/chip technology, as well as telecommunication, optical communications engineering and optics/lighting in the automotive sector, with a refractive index of $1.80 \leq n_d \leq 1.95$ and an Abbe value from $19 \leq v_d \leq 28$ with excellent chemical resistance and stability to crystallization. These optical glasses have a composition, in weight. % based on oxide content, of: $P_2O_5$, 14-35; $Nb_2O_5$, 45-50; $Li_2O$, 0-4; $Na_2O$, 0-4; $K_2O$, 0.5-5; $BaO$, 17-23; $ZnO$, 0.1-5; $TiO_2$, 1-<5; $ZrO_2$, 0-6; and $Sb_2O_3$, 0.1-2.

14 Claims, No Drawings

LEAD-FREE OPTICAL GLASSES WITH A HARD FLINT POSITION

CROSS-REFERENCE

The invention described and claimed hereinbelow is also described in German Patent Application 10 2006 013 599.7, filed on Mar. 22, 2006, in Germany, whose subject matter is hereby incorporated by reference thereto. This German Application provides the basis for a claim of priority under 35 U.S.C. 119.

BACKGROUND OF THE INVENTION

1. The Field of the Invention

The present invention relates to an optical glass, a method of producing the aforesaid optical glass, uses of the aforesaid optical glass, optical elements or preforms of such optical elements made with the aforesaid optical glass, and optical parts or optical components comprising such optical elements.

2. Related Art

Conventional optical glasses of the optical position claimed here (extreme hard flint position) generally contain PbO in order to achieve the desired optical properties, i.e. preferably a refractive index $n_d$ of $1.80 \leq n_d \leq 1.95$ and/or an Abbe number $v_d$ of $19 \leq v_d \leq 28$, but particularly the high refractive index. Hence, these glasses are chemically not very stable. $As_2O_3$ is furthermore often used as a fining agent.

Since the glass components PbO and $As_2O_3$ have been regarded as environmentally hazardous in recent years, most manufacturers of optical instruments and products tend to prefer the use of lead- and arsenic-free glasses. For use in high quality products, i.e. products of increased material grade, glasses with increased chemical stability are also constantly gaining in importance.

Known lead-free glasses of the hard flint or lanthanum hard flint position, with a high refractive index and a low Abbe number, generally contain large amounts of $TiO_2$ in a silicate matrix, which leads to extreme crystallization instabilities and therefore glasses which are often not workable in a secondary hot pressing step, and which are very difficult to process mechanically due to high hardness.

Instead of the hitherto customary machining of optical components from glass in block or ingot form, production methods have recently gained in importance in which direct pressings, i.e. precision-moulded optical components and/or preforms for re-pressing which are as close as possible to the final contour, so-called "precision gobs", can be obtained directly at the end of melting the glass. "Precision gobs" generally means preferably fully fire-polished, semifree- or free-formed glass portions, which can be obtained via various production methods.

For this reason the need for "short" glasses, i.e. for glasses the viscosity of which changes very strongly with temperature, has been reported more and more in the context of melting and moulding process technology. This method shows an advantage during processing, namely that it is possible to reduce the moulding times, and therefore the mould closure times, in precision moulding processes resulting in products close to final geometry. Hence, on the one hand the throughput is increased, and on the other hand the mould material is spared, which has a highly positive effect on the overall production costs. Furthermore, due to the faster solidification thereby obtained, it is also possible to work glasses with a stronger susceptibility to crystallization than in the case of correspondingly longer glasses, and pre-nucleation, which could be problematic in later secondary hot pressing, is avoided or at least drastically reduced.

For the same reason, there is likewise a need for glasses the temperature-viscosity profile of which in absolute terms comprises low temperatures in the moulding range. Through lower process temperatures, this also contributes to increased mould lifetimes and, through fast stress-free cooling, to low pre-nucleation rates. This also offers a greater range of potentially more cost-effective mould materials, which is significant particularly in precision moulding close to final geometry.

The prior art relevant to the invention is summarized in the following documents:

| | | |
|---|---|---|
| DE | 2905875 | Nippon Kogaku |
| EP | 1 468 974 | Hoya |
| EP | 1 493 720 | Hoya |
| JP | 09 188 540 | Ohara |
| EP | 1 382 582 | Ohara |

According thereto, it is possible to produce glasses with a similar optical position or comparable chemical composition, although they show significant disadvantages in direct comparison with the glasses according to the invention:

The glasses described in the examples of DE 2905875 have an $Nb_2O_5$ content of equal to or less than 39 wt. %. The optical position desired for the glasses according to the invention therefore cannot be achieved without using large amounts of expensive, likewise high-index components in parallel with increased amounts of $TiO_2$, albeit such that the crystallization stability of the glasses is critically reduced, i.e. the solubility limits in the $Nb_2O_5$—$P_2O_5$ matrix.

EP 1 468 974 (Prio '03) describes niobium phosphate glasses mandatorily containing bismuth. Owing to the intrinsic absorption of bismuth oxide, these glasses have poor transmission at the blue spectral edge. They are also more redox-sensitive compared to bismuth-free glasses, i.e. insufficiently oxidative melt control could lead to $Bi^0$ colloids which cause a grey-violet colouration of the glasses. The process window for melting is thereby greatly reduced, which leads to increased production costs and potentially lower yields.

The glasses described in EP 1 493 720 (Prio '03) likewise derive from the niobium phosphate glass system, although they mandatorily contain either bismuth oxide (up to 37 wt. %) with the aforementioned disadvantages or large amounts of lithium oxide (up to 15 wt. %). Increased levels of lithium oxide lead to enhanced aggressivity of the melt in respect to the refractory material. Besides shorter equipment lifetimes, this leads to a strong ingress of the refractory material into the glass. In the case of platinum this leads to transmission losses at the blue spectral edge, and in the case of ceramic materials to enhanced susceptibility to crystallization in the melt as well as in case of primary and secondary hot pressing (for example re-pressing) by ingress of heterogeneous crystallization nuclei.

The glasses disclosed in JP 09 188 540 (Prio '95) have a maximum total alkaline-earth metal oxide content of 20 wt. %. This restricts the potential for adjusting a sufficiently "steep" viscosity-temperature profile and therefore the processability in moulding processes close to final geometry (for example "precision moulding").

Despite the redox sensitivity of niobium phosphate glasses, the glasses described in EP 1 382 582 (Prio '02) have only extremely low levels of stabilizing antimony oxide (up to 0.03 wt. % maximum). This makes the melting process more susceptible to inevitable fluctuations, and increases the process costs because of increased monitoring work and potentially lower yields.

SUMMARY OF THE INVENTION

Therefore, it is an object of the present invention to provide optical glasses which avoid the problems of the aforementioned prior art and which facilitate the desired optical properties. These glasses should preferably be workable via the precise pressing method and have low transition temperatures. Furthermore, they should be readily meltable and workable, and have a sufficient crystallization stability for a secondary hot pressing step and/or be manufactured in a continuously run plant. A glass, which is as short as possible in a viscosity range of $10^{7.6}$ to $10^{13}$ dPas, is furthermore desirable.

The above-described object is achieved by the optical glasses, which are claimed in the claims appended herein below and which are described herein below.

In particular, according to the present invention an optical glass is provided which comprises the following composition, in wt. % based on oxide content:

| | |
|---|---|
| $P_2O_5$ | 14-35 |
| $Nb_2O_5$ | 45-50 |
| $Li_2O$ | 0-4 |
| $Na_2O$ | 0-4 |
| $K_2O$ | 0.5-5 |
| BaO | 17-23 |
| ZnO | 0.1-5 |
| $TiO_2$ | 1-<5 |
| $ZrO_2$ | 0-6 |
| $Sb_2O_3$ | $\geq 0.1$. |

The glasses according to the invention have a refractive index ($n_d$) of preferably $1.80 \leq n_d \leq 1.95$, more preferably $1.81 \leq n_d \leq 1.94$, and/or an Abbe number ($v_d$) of preferably $19 \leq v_d \leq 28$, more preferably $20 \leq v_d \leq 27$.

Unless otherwise indicated at the corresponding point, the expression "X-free" or "free of a component X" means that this component X is not substantially present in the glass, i.e. such a component is present at the most as an impurity in the glass but is not added as a separate component to the glass composition. X stands for any component, for example $Li_2O$.

The term "optical position" is intended to mean the position of a glass in the Abbe diagram, which is defined by the values of a glass for $n_d$ and $v_d$.

The basic glass system is a niobium phosphate glass, phosphate being used as a solvent for the niobium oxide needed for adjusting the desired optical position.

The glass contains phosphate or $P_2O_5$ in a proportion of 14 wt. % minimum, preferably 17 wt. % minimum, more preferably 21 wt. % minimum. The proportion of $P_2O_5$ is restricted to 35 wt. % maximum, preferably 30 wt. % maximum, particularly preferably 26 wt. % maximum. With a phosphate level of more than approximately 35 wt. %, no more high-index components can be added to the glass at a level sufficient for the high refractive index.

Furthermore, the glass contains at least three components, which are used to increase the refractive index. In particular, the glass contains at least $Nb_2O_5$, BaO and $TiO_2$.

As a main or primary component for achieving the desired optical position and in particular the high refractive index, the glass contains $Nb_2O_5$ in a proportion of 45 wt. % minimum, preferably 46 wt. % minimum, and 50 wt. % maximum. $Nb_2O_5$ contents of more than 50 wt. % entail the risk that the $Nb_2O_5$ will no longer fully dissolve in the matrix, and may thus cause crystallization of the melt.

In order to ensure solubility of the $Nb_2O_5$ in the glass matrix, the ratio of $Nb_2O_5$ to $P_2O_5$ should also lie in a particular range. The $Nb_2O_5/P_2O_5$ ratio (in wt. %) is preferably 3.5 maximum, more preferably 3.0 maximum, most preferably 2.5 maximum. With $Nb_2O_5/P_2O_5$ ratios of more than 3.5, the glasses become unstable; "devitrification" occurs, presumably by demixing and/or crystallization. The $Nb_2O_5/P_2O_5$ ratio (in wt. %) is preferably approximately 1.2 minimum, more preferably 1.5 minimum, particularly preferably 1.7 minimum. Very low $Nb_2O_5/P_2O_5$ ratios are in fact be desirable with a view to the devitrification stability, but would demand much higher absolute phosphate contents so that it would not be possible to introduce enough high-index components such as $TiO_2$, $ZrO_2$ and BaO in order for achieving the refractive index position desired here and/or network modifiers, particularly oxides of divalent metals MO i.e. here the alkaline-earth metal oxides MgO, CaO, BaO, for adjusting the desired shortness of the material.

As a second main component or secondary component for achieving the desired refractive index position, besides $Nb_2O_5$ the glass according to the invention also contains the high-index alkaline-earth metal oxide BaO in a proportion of 17 wt. % minimum, preferably 18 wt. % minimum, particularly preferably 22 wt. % minimum, and 23 wt. % maximum, preferably 22 wt. % maximum. With BaO contents of less than 17 wt. %, it would not be possible to achieve the desired high refractive index.

Although $Nb_2O_5$ no longer dissolves fully in the matrix in a proportion of more than 50 wt. % and may cause crystallization of the melt, surprisingly mixtures of up to 50 wt. % $Nb_2O_5$ with up to 23 wt. % BaO still dissolve well even at such a high level.

Instead of BaO, higher proportions of other such high-index components, for example $TiO_2$ and/or $ZrO_2$, would also lead to a shift of the optical position towards further increased dispersion. High levels of these components, however, place extreme demands on the chromatic aberration correction in the optical design, which makes such glasses impracticable particularly in the field of optics for the consumer sector.

Added in small amounts, $TiO_2$ and optionally $ZrO_2$, albeit besides $Nb_2O_5$ and BaO, also prove advantageous as further tertiary high-index component(s) for the glass according to the invention. Preferably, however, the total content of these two components $TiO_2$ and $ZrO_2$ is restricted to 7 wt. % maximum according to most embodiments of the present invention. Limiting these components is also desirable so as not to increase the crystallization tendency of the glass.

The glass according to the invention contains $TiO_2$ in a proportion of 1 to less than 5 wt. %, preferably 2 wt. % minimum, more preferably 3 wt. % minimum.

Furthermore, the glass according to the invention may contain $ZrO_2$ in a proportion of 6 wt. % maximum, preferably up to at most 4 wt. % maximum. According to one embodiment of the present invention, however, the glasses are $ZrO_2$-free.

For the purpose of reducing the susceptibility to crystallization of the glasses according to the invention, it is necessary to add a small but significant ZnO content of 0.1 to 5 wt. %, preferably less than 4 wt. %, particularly preferably 1 wt. % maximum, which prevents or impedes the formation of a crystal lattice. ZnO levels of more than 5 wt. %, however, reduce the refractive index so that the desired optical position cannot be achieved.

K$_2$O is needed in a proportion of 0.5 to 5 wt. % for flexible fine adjustment both of the optical position and of the temperature-viscosity profile. Lower levels would not give the desired effect, whereas higher levels lead to lower refractive indices and/or "long" glasses.

The lower alkali metal oxides Li$_2$O and Na$_2$O may be added to the glass according to the invention for special application-specific adaptations, for example in order to make the glass suitable for ion exchange or for fine adaptation of the temperature-viscosity profile. The proportion of alkali metal oxides in total is preferably 8 wt. % maximum, more preferably 6 wt. % maximum, especially preferably 5 wt. % maximum. Levels of more than 8 wt. % lead to an unacceptably strong influence in the direction of lower refractive indices and/or "longer glasses".

Na$_2$O may be contained in a proportion of 4 wt. % maximum, preferably 3 wt. % maximum, especially preferably 0.5 wt. % maximum.

Li$_2$O may be contained in a proportion of 4 wt. % maximum, preferably 3 wt. % maximum. Some embodiments of the glass according to the invention, however, are Li$_2$O-free. Lithium contents of more than 4 wt. % lead to an enhanced aggressive behaviour of the melt vis-a-vis the refractory material. This leads to a strong ingress of the refractory material into the glass and to shorter equipment lifetimes. If platinum is used as a refractory material, this leads to transmission losses at the blue spectral edge and, as when using ceramic materials, to enhanced susceptibility to crystallization in the melt as well as both primary and secondary hot pressing by ingress of heterogeneous crystallization nuclei.

The glasses according to the invention are also preferably free of B$_2$O$_3$. B$_2$O$_3$ has a detrimental effect on glasses, particularly in combination with platinum melting equipment. B$_2$O$_3$ per se causes an increase of the ion mobility in the glass, which leads to greater susceptibility to devitrification. This effect is increased in combination with melting in a platinum crucible since, by its aggressive behaviour vis-à-vis the crucible material, B$_2$O$_3$ increases the ingress of heterogeneous platinum nuclei. In addition, the increased platinum ingress also deteriorates the transmission, particularly in the blue spectral range.

For fine adjustment of the viscosity-temperature profile, the glasses according to the invention may have a content of 5 wt. % maximum in total of the oxides of bivalent metals of the group MO, i.e. MgO, CaO and/or SrO, on the one hand and F on the other. Exceeding this upper limit would have a detrimental effect on the viscosity-temperature profile (glasses which are too short) and depart from the desired optical position by significantly reducing the refractive index and increasing the Abbe number.

Since the glass according to the invention is redox-sensitive, shifting the conditions towards reducing conditions when melting can cause a strong coloration of the glass due to resulting colloidal particles. In order to counteract this effect and avoid a melt in which reducing conditions are present, the glass according to the invention contains Sb$_2$O$_3$ in a proportion of 0.1 wt. % minimum, preferably 0.2 wt. % minimum, and 2 wt. % maximum, preferably 0.8 wt. % maximum. Thus, this component is used only secondarily as a fining agent and serves primarily to ensure oxidative melt conditions. However, since Sb$_2$O$_3$ has an intrinsic absorption, the level of 2 wt. % should not be exceeded. The higher the Sb$_2$O$_3$ level, the more strongly the absorption edge in the blue spectral range is shifted towards higher wavelengths, so that chromatic aberrations in imaging the visual range may occur with increased amounts of Sb$_2$O$_3$.

Besides Sb$_2$O$_3$, the glass according to the invention may contain other conventional fining agents in small amounts. The total of these other added fining agents is preferably 1.0 wt. % maximum, these amounts being added to the components of the remaining glass composition giving 100 wt. %. The following components may be used as further fining agents (in wt. % additionally to the remaining glass composition):

| | | |
|---|---|---|
| As$_2$O$_3$ | 0-1 | and/or |
| SnO | 0-1 | and/or |
| SO$_4^{2-}$ | 0-1 | and/or |
| NaCl | 0-1 | and/or |
| F$^-$ | 0-1 | |

For more flexible adjustment of a special optical position within the achievable optical position range, the glasses according to the invention may also contain one or more oxides of the group La$_2$O$_3$, Y$_2$O$_3$, Bi$_2$O$_3$, Gd$_2$O$_3$, GeO$_2$, Ta$_2$O$_5$, Yb$_2$O$_5$, WO$_3$ in a total proportion of 5 wt. % maximum, preferably 2 wt. % maximum. Increasing the total content of components in this group La$_2$O$_3$, Y$_2$O$_3$, Bi$_2$O$_3$, Gd$_2$O$_3$, GeO$_2$, Ta$_2$O$_5$, Yb$_2$O$_5$, WO$_3$ beyond 5 wt. % would lead to losses in the transmission (due to Y$_2$O$_3$, La$_2$O$_3$, Bi$_2$O$_3$, Gd$_2$O$_3$, Yb$_2$O$_5$, WO$_3$), increased susceptibility to devitrification (due to GeO$_2$, La$_2$O$_3$, Bi$_2$O$_3$), and/or undesired "length" of the glass (due to GeO$_2$).

According to most embodiments as an optical glass, the glass according to the invention is preferably free of colouring and/or optically active e.g. laser-active components. According to another embodiment of the present invention, when used as a base glass for optical filters or solid-state lasers, the glass according to the invention may nevertheless contain colouring and/or optically active e.g. laser-active components in proportions of 5 wt. % maximum, these amounts being added further to the components of the remaining glass composition giving 100 wt. %.

According to most embodiments, the glass according to the invention preferably contains no aluminium oxide. According to a particular embodiment of the present invention, however, the glass is also suitable for ion exchange processes. According to this embodiment, it is preferable for the glass to contain Al$_2$O$_3$. A low Al$_2$O$_3$ proportion of 6 wt. % maximum promotes the formation of a structure in the material, which additionally enhances the ion exchange by increasing the ion mobility. Increasing the Al$_2$O$_3$ content beyond 6 wt. %, however, would lead to increased susceptibility to devitrification and undesired "length" of the glass, and, therefore, is not preferred. A glass according to this embodiment may also contain silver oxide in a proportion of 5 wt. %, preferably 2 wt. %. Increasing the silver oxide content beyond 5 wt. %, however, would lead to losses in the transmission of the glass.

According to one embodiment of the invention, the glass is free of environmentally hazardous components, for example lead and/or arsenic.

According to another embodiment of the present invention, the glass according to the invention is also preferably free of other components not mentioned in the claims and/or this description, i.e. according to such an embodiment the glass consists essentially of the said components. In this case the expression "essentially consist of" means that other components are present as impurities at the most, but are not deliberately added as separate components to the glass composition. According to one embodiment of the present invention, preferably from 90 to 95 wt. % of the glass according to the invention consists of the said components.

According to one embodiment, the glass according to the invention is "contamination-free", i.e. it contains essentially no compounds, which are introduced as an impurity (impurities) by the melting process. In particular, the glass is contamination-free with respect to $SiO_2$ and also contamination-free with respect to residues of metallic crucible materials, especially $Pt^{0/I}$, Au, Ir or alloys of these metals. The expression "contamination-free" means that these components are neither added as components to the glass batch nor introduced into the glass as an impurity by crucible corrosion when melting the glass. The expression "contamination-free with respect to $SiO_2$" means that the glass contains 0.1 wt. % $SiO_2$, maximum, preferably 500 ppm maximum. The expression "contamination-free with respect to residues of metallic crucible materials" means that the glass contains 100 ppm maximum, preferably 60 ppm maximum, of such residues of metallic crucible materials. Glasses according to this embodiment have a significantly increased transmission together with greatly increased crystallization stability. In this case, the increased crystallization stability is in this case based on the absence of heterogeneous $SiO_2$ and/or metallic crystallization nuclei, which usually enter the melt by ingress from the respectively selected crucible material. A reduction in the transmission throughout the band range is avoided by the absence of scattering colloidal $Pt^0$ particles and scattering silicate particles and microcrystallization based thereon. Also the absence of $Pt^I$, which absorbs through its band spectrum, or similar metal ions, results in improved transmission. The glass according to this embodiment can be obtained by suitable process control. In particular, the melting crucible or the melting trough must be cooled sufficiently so that a coating of the glass is formed on the surface of the melting trough and the glass melt per se has essentially no contact to the surface of the crucible or trough, and the coating serves to protect against impurities from the crucible or trough.

All glasses according to the invention have a Tg of 715° C. maximum, are crystallization-stable and can be worked well.

All glasses according to the invention have anomalous relative partial dispersions $\Delta P_{g,F}$ greater than or equal to $130\times10^{-4}$ on measurement samples from cooling with a cooling rate of about 7 K/h, i.e. they are highly suitable for an optical colour correction in colour imaging systems.

All glasses according to the invention have specific densities ρ of 4.2 g/cm³ maximum. Because of their comparatively low weight, the optical elements and/or optical components made from them are therefore particularly suitable for mobile or portable units.

All glasses according to the invention have thermal expansion coefficients α of at most $8.2\times10^{-7}$/K in the range of 20 to 300° C. Therefore, they differ significantly from known phosphate glasses, which have problems with thermal stress in reworking and assembly technology because of their extremely high thermal expansion, in the region of about $14\times10^{-7}$/K.

Furthermore, all the glasses according to the invention have good chemical stability and stability against crystallization, and crystallization stability respectively. Moreover, they are distinguished by good meltability and flexible workability close to final geometry, low production costs due to reduced process costs, good ion exchange properties and good environmental friendliness.

Using the glasses according to the invention, an adjustment of optical position, viscosity-temperature profile and working temperatures has been achieved such that highly specified moulding close to final geometry is ensured even with sensitive precision machines. In addition, a correlation of crystallization stability and viscosity-temperature profile has been achieved so that further thermal processing of the glasses is easily possible, for instance pressing or re-pressing, or ion exchange processes.

In addition, the invention relates to a method for producing an optical glass, comprising the step that oxidizing conditions are set up in the melt.

According to one embodiment of the method according to the invention, at least a significant proportion of a component, in particular 0.2 wt. % minimum, is added as nitrate to the batch to be melted. For example, "0.2 wt. %" in the case of nitrate means that 0.2 wt. % of the corresponding metal oxide is converted to the same molar proportion of the corresponding nitrate and this proportion is added as nitrate to the melt batch. Nitrate oxidizes the fining agent per se in redox fining systems and, therefore, is preferably used when fining with $As_2O_3$ and/or $Sb_2O_3$.

An oxidizing gas may likewise be introduced into the melt in order to set up oxidative conditions in the melt, gases containing oxygen being preferred, e.g. air or pure oxygen.

Furthermore, the melting crucible or the melting trough may furthermore be cooled sufficiently so that a coating of the glass forms on the surface of the melting trough and the glass melt per se has essentially no contact to the surface of the crucible or trough, and the glass coating serves as protection against impurities from the crucible or trough.

The phosphate proportion is preferably added to the batch as a complex phosphate, i.e. phosphate is added not in the form of free $P_2O_5$ but as a compound with other components, for example as a phosphoric acid derivative such as $Ba(H_2PO_4)_2$.

Moreover, the present invention relates to the use of the glasses according to the invention for the application fields of imaging, sensors, microscopy, medical technology, digital protection, telecommunication, optical communications engineering/information transmission, optics/lighting in the automotive sector, photolithography, steppers, excimer lasers, wafers, computer chips as well as integrated circuits and electronic devices which contain such circuits and chips.

Furthermore, the present invention relates to optical elements, which comprise the glass according to the invention. In this case, optical elements may particularly be lenses, prisms, light guide rods, arrays, optical fibres, gradient components, optical windows and compact components. According to the invention, the term "optical element" also includes preforms of such an optical element, for example gobs, precision gobs and the like.

Moreover, the invention relates to a method for producing an optical element or an optical component, comprising the step of:

pressing the optical glass according to the invention.

The pressing of the glass is preferably a precise pressing process.

According to one embodiment, the glass is worked into an optical component by re-pressing.

The term "precise pressing" as used according to the invention to mean a pressing method in which the surface of the optical component being produced no longer needs to be finished or polished after the precise pressing, but instead has a basically sufficient surface quality.

In conventional pressing methods, the surface does not have a sufficient optical quality after pressing, and the pressed article must, for example, be polished before further use.

As a starting material, glass for a pressing method may be worked directly from the melt. In the case of precise pressing, the term precision moulding is then used.

As an alternative direct pressing from the glass melt, a solidified glass gob may be reheated; in this case the pressing process is a secondary hot pressing process, which is also referred to as re-pressing. The demands on glasses for such re-pressing are very high. These glasses must be much more crystallization-stable than glasses which are processed directly from the melt and are not heated to the working temperature for a second time.

For re-pressing, it is possible to use gobs or sawed preforms. So-called precision gobs are also preferably used for precise pressing, i.e. solidified glass gobs the weight of which already corresponds to the final weight of the optical component to be produced and the shape of which is also preferably similar to the final shape of the optical component to be produced. In the case of such precision gobs, re-pressing does not leave a protruding burr of excess material, which would have to be removed in a further working step.

Furthermore, the invention relates to the use of such an optical element to produce optical parts, for example sensors, microscopy, medical technology, digital protection, telecommunication, optical communications engineering/information transmission, optics/lighting in the automotive sector, photolithography, steppers, excimer lasers, wafers, computer chips as well as integrated circuits and electronic devices which contain such circuits and chips.

Moreover, the invention relates to optical parts, for example for imaging sensors, microscopy, medical technology, digital protection, telecommunication, optical communications engineering/information transmission, optics/lighting in the automotive sector, photolithography, steppers, excimer lasers, wafers, computer chips as well as integrated circuits and electronic devices containing such circuits and chips.

The present invention will be explained in more detail below by a series of examples. The present invention is not, however, restricted to these examples.

EXAMPLES

Table II contains 8 exemplary embodiments in the preferred composition range, as well as two comparative examples. The glasses described in the examples were produced as follows:

The raw materials for the oxides, preferably the corresponding carbonates, and the phosphate proportion, preferably as complex phosphates, are weighed out, one or more fining agents, such as $Sb_2O_3$, are added and subsequently mixed well. The glass batch is melted at about 1200° C. in a discontinuous batch melting equipment, subsequently refined (1250° C.) and homogenized. At a casting temperature of about 1000° C., the glass can be cast and worked to the desired dimensions. In large-volume continuous equipment, experience shows that the temperatures can be reduced by at least about 100 K and the material can be worked by the method of moulding close to final geometry, for example precise pressing.

TABLE I

EXAMPLE OF A GLASS BATCH USED TO MAKE THE GLASS OF EXAMPLE 2 OF TABLE II (calculated for 100 kg)

| Oxide | wt. % | Raw material | Weigh-in (kg) |
|---|---|---|---|
| $Nb_2O_5$ | 46.0 | $Nb_2O_5$ | 46.07 |
| $P_2O_5$ | 26.0 | $P_2O_5$ | 6.85 |
| BaO | 20.0 | $Ba(H_2PO_4)_2$ | see BaO |
|  |  | $Ba(H_2PO_4)_2$ | 44.62 |
| $Na_2O$ | 0.1 | $NaCO_3$ | 0.17 |
| $K_2O$ | 3.6 | $K_2CO_3$ | 4.71 |
|  |  | $KNO_3$ | 0.86 |
| ZnO | 0.8 | ZnO | 0.80 |
| $TiO_2$ | 3.0 | $TiO_2$ | 3.01 |
| $Sb_2O_3$ | 0.5 | $Sb_2O_3$ | 0.50 |
| Total | 100.0 |  | 107.58 |

The properties of the example of the glass obtained from this glass batch are reported in Table II as Example 2.

TABLE II

EXEMPLARY GLASS COMPOSITIONS OF THE INVENTION AND COMPARATIVE COMPOSITIONS AND THEIR PROPERTIES (ingredient amounts are in wt. %)

| | Examples | | | | | |
|---|---|---|---|---|---|---|
| | 1 | 2 | 3 | 4 | 5 | 6 |
| $P_2O_5$ | 21.0 | 26.0 | 24.0 | 21.5 | 30.0 | 25.0 |
| $Nb_2O_5$ | 50.0 | 46.0 | 47.0 | 48.0 | 44.8 | 46.3 |
| $Li_2O$ |  |  |  |  | 3.0 | 0.5 |
| $Na_2O$ |  | 0.1 | 0.5 | 0.2 |  | 3.0 |
| $K_2O$ | 4.5 | 3.6 | 1.5 | 4.0 | 1.0 | 1.0 |
| BaO | 19.0 | 20.0 | 22.0 | 20.5 | 18.0 | 20.0 |
| ZnO | 0.1 | 0.8 | 1.0 | 0.7 | 0.4 | 0.4 |
| $TiO_2$ | 4.9 | 3.0 | 3.2 | 4.8 | 2.0 | 2.0 |
| $ZrO_2$ |  |  |  |  | 0.5 | 1.0 |
| $Sb_2O_3$ | 0.5 | 0.5 | 0.8 | 0.3 | 0.3 | 0.8 |
| Total | 100.0 | 100.0 | 100.0 | 100.0 | 100.0 | 100.0 |
| $n_{d[7K/h]}$ | 1.9277 | 1.8669 | 1.8978 | 1.9188 | 1.83526 | 1.86469 |
| $v_{d[7K/h]}$ | 20.61 | 22.89 | 22.11 | 21.10 | 24.77 | 23.51 |
| $P_{g,F[7K/h]}$ | 0.6403 | 0.6298 | 0.6333 | 0.6381 | 0.6211 | 0.6261 |
| $\Delta P_{g,F}(10^{-4})_{[7K/h]}$ | 312 | 245 | 267 | 297 | 189 | 219 |

TABLE II-continued

EXEMPLARY GLASS COMPOSITIONS OF THE INVENTION AND
COMPARATIVE COMPOSITIONS AND THEIR PROPERTIES (ingredient
amounts are in wt. %)

| | | | | | | |
|---|---|---|---|---|---|---|
| Colour impression | colourless | colourless | colourless | colourless | colourless | colourless |
| $\alpha_{20-300}$ ($10^{-6} \times K^{-1}$) | 7.3 | 6.8 | 6.8 | 7.5 | 7.6 | 7.8 |
| Tg (° C.) | 713 | 707 | 699 | 710 | 586 | 629 |
| $\rho$ (g/cm$^3$) | 4.00 | 3.88 | 4.02 | 4.02 | 3.73 | 3.92 |

| | Examples | | | | | |
|---|---|---|---|---|---|---|
| | 7 | 8 | 9 | 10 | Comp. 1 | Comp. 2 |
| $P_2O_5$ | 20.0 | 32.0 | 21.5 | 19.3 | 19.8 | 19.8 |
| $Nb_2O_5$ | 48.5 | 45.0 | 48.0 | 48.5 | 48.0 | 48.0 |
| $Li_2O$ | | 4.0 | | | | |
| $Na_2O$ | 0.2 | | 0.2 | 0.2 | 0.6 | 0.2 |
| $K_2O$ | 4.2 | 0.5 | 4.0 | 4.0 | 2.6 | 4.1 |
| BaO | 21.0 | 17.0 | 20.0 | 19.5 | 21.0 | 20.5 |
| ZnO | 0.5 | 0.1 | 0.7 | 0.3 | | 0.5 |
| $TiO_2$ | 4.6 | 1.0 | 4.8 | 4.9 | 4.7 | 4.7 |
| $ZrO_2$ | 0.7 | | | | 1.0 | 1.0 |
| $SiO_2$ | | | 0.5 | | | |
| $B_2O_3$ | | | | 3.0 | | |
| $Al_2O_3$ | | | | | 2.0 | 1.2 |
| $Sb_2O_3$ | 0.3 | 0.4 | 0.3 | 0.3 | 0.3 | |
| Total | 100.0 | 100.0 | 100.0 | 100.0 | 100.0 | 100.0 |
| $n_{d[7K/h]}$ | 1.9328 | 1.8127 | 1.9112 | 1.9335 | | 1.9106 |
| $v_{d[7K/h]}$ | 20.88 | 26.10 | 22.30 | 20.56 | | 21.87 |
| $P_{g,F[7K/h]}$ | 0.6383 | 0.6152 | 0.6324 | 0.6380 | | 0.6332 |
| $\Delta P_{g,F}(10^{-4})_{[7K/h]}$ | 296 | 153 | 284 | 294 | | 262 |
| Colour impression | colourless | colourless | colourless | yellow | white | red |
| $\alpha_{20-300}$ ($10^{-6} \times K^{-1}$) | 7.5 | 8.0 | 7.4 | 7.2 | | 7.5 |
| Tg (° C.) | 703 | 561 | 712 | 656 | | 678 |
| $\rho$ (g/cm$^3$) | 4.07 | 3.65 | 4.00 | 3.98 | | 4.02 |

Comparative Example 1 is a composition with which no transparent glass was obtained due to the lack of ZnO. Instead strong devitrification took place when cooling the composition so as to create a glass ceramic. Therefore, it was not possible to determine the optical data.

Comparative Example 2 is a composition, which does not contain any antimony oxide. Consequently, the oxidative potential of the composition is too low and leads to a shift in the redox state of the melt and, thus, to a deep dark red visual colour impression, which is unacceptable for an optical glass.

All glasses of Examples 1 to 8 have a $SiO_2$ content of less than 0.1 wt. % and a content of less than 100 ppm of residues of the metallic crucible materials. They are distinguished by a high crystallization stability and excellent transparency.

The composition of Example 9 is a composition less preferred according to certain embodiments, since it contains small amounts but more than 0.1 wt. % $SiO_2$. An increased crystallization tendency can be observed with this glass. At 790° C., the LDL of this comparative example is 50 K lower than in the case of Example 4, which is the closest example to it (LDL~840° C.). The "LDL" is in this case intended to mean the so-called lower devitrification limit. This is the temperature at which, under rising temperature control, devitrification of the material begins. The lower the LDL, the smaller is the process window for any secondary hot pressing processes. Already a difference of 50 K is significant in the secondary hot pressing sector, since "short" glasses are preferably used for the precision moulding.

The glass according to Example 10 also belongs to a less preferred embodiment, the yellow visual colour impression of which is attributable to the presence of significant $B_2O_3$ proportions with the simultaneous use of a platinum melting crucible.

The glasses according to the invention have optical data in common with known optical glasses of this position. They are, however, distinguished by better chemical stability and processability, lower production costs due to reduced raw material and process costs, sufficient crystallization stability owing to their shortness, and by environmental friendliness. By means of the glasses according to the invention as supported with examples (Table 2), an adjustment of crystallization stability and viscosity-temperature profile has been achieved so that further thermal processing (pressing or re-pressing) of the glasses is easily possible.

While the invention has been illustrated and described as embodied in lead-free optical glasses with a hard flint position, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An optical glass that is free of boron constituents and has a composition, in wt. % based on oxide content, of:

| | |
|---|---|
| $P_2O_5$ | 14-35 |
| $Nb_2O_5$ | 45-50 |

-continued

| | |
|---|---|
| Li$_2$O | 0-4 |
| Na$_2$O | 0-4 |
| K$_2$O | 0.5-5 |
| BaO | 17-23 |
| ZnO | 0.1-5 |
| TiO$_2$ | 1-<5 |
| ZrO$_2$ | 0-6 |
| Sb$_2$O$_3$ | ≧0.1. |

2. The glass according to claim 1, which is contamination-free of amounts of SiO$_2$, and/or contamination-free of residues of metallic crucible materials.

3. The glass according to claim 1, wherein a total amount of said TiO$_2$ and said ZrO$_2$ does not exceed 7 wt. % and/or a total amount of alkali metal oxides present does not exceed 8 wt. %.

4. The glass according to claim 1, containing up to 6 wt. % of aluminium oxide.

5. The glass according to claim 1, containing up to 5 wt. % of Ag$_2$O.

6. The glass according to claim 1, containing at least one oxide ingredients selected from the group consisting of La$_2$O$_3$, Y$_2$O$_3$, Bi$_2$O$_3$, Gd$_2$O$_3$, GeO$_2$, Ta$_2$O$_5$, Yb$_2$O$_5$ and WO$_3$, and wherein a sum total amount of said one or more oxide ingredients does not exceed 5 wt. %.

7. The glass according to claim 1, containing one or more ingredients selected from the group consisting of MgO, CaO, SrO and F, and wherein a sum total amount of said one or more ingredients does not exceed 5 wt. %.

8. The glass according to claim 1, which is free of Pt and free of SiO$_2$.

9. The glass according to claim 1, further comprising one or more of the following components as fining agents, in wt. %:

| | | |
|---|---|---|
| As$_2$O$_3$ | 0-1 | and/or |
| SnO | 0-1 | and/or |
| NaCl | 0-1 | and/or |
| SO$_4^{2-}$ | 0-1 | and/or |
| F$^-$ | 0-1. | |

10. The glass according to claim 1, having a refractive index $n_d$ of $1.80 \leq n_d \leq 1.95$ and/or an Abbe number $v_d$ of $19 \leq v_d \leq 28$.

11. A method of producing a glass according to claim 1, said method comprising setting oxidizing conditions in a glass melt from which said glass is made.

12. An optical element, which is a lens, prism, light guide rod, array, optical fiber, gradient component, or an optical window, said optical element comprising a glass as defined in claim 1.

13. A method of producing an optical element, said method comprising pressing a glass as defined in claim 1 to form said optical element.

14. An optical part or an optical component for imaging, sensors, microscopy, medical technology, digital protection, telecommunication, optical communications engineering/information transmission, optics/lighting in the automotive sector, photolithography, steppers, excimer lasers, wafers, computer chips, as well as integrated circuits and electronic devices which contain such circuits and chips, said optical part or component comprising a glass as defined in claim 1.

* * * * *